United States Patent
Brouwer et al.

(10) Patent No.: US 7,114,613 B2
(45) Date of Patent: Oct. 3, 2006

(54) ARTICLE UNSCRAMBLER WITH HIGH SPEED TAPERED ROLLER

(75) Inventors: Gerald A Brouwer, Grandville, MI (US); James P Johnson, Rockford, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 11/093,538

(22) Filed: Mar. 30, 2005

(65) Prior Publication Data

US 2005/0167244 A1    Aug. 4, 2005

Related U.S. Application Data

(63) Continuation of application No. 10/407,314, filed on Apr. 4, 2003, now abandoned.

(60) Provisional application No. 60/369,975, filed on Apr. 4, 2002.

(51) Int. Cl.
B65G 13/02 (2006.01)

(52) U.S. Cl. ...................................... 198/786; 198/784

(58) Field of Classification Search ................ 198/443, 198/448, 456, 784, 786
See application file for complete search history.

(56) References Cited

U.S. PATENT DOCUMENTS

| | | | |
|---|---|---|---|
| 1,959,157 A | 5/1934 | Eggleston | |
| 3,266,618 A | 8/1966 | Hundertmark et al. | |
| 3,646,652 A | 3/1972 | Heiligenthal et al. | |
| 3,651,911 A | 3/1972 | Kornylak | |
| 3,724,643 A | 4/1973 | Kohl | |
| 4,096,942 A | 6/1978 | Shepherd | |
| 4,312,444 A * | 1/1982 | Mushovic | 198/780 |
| 4,434,886 A * | 3/1984 | Fajt | 198/389 |
| 4,685,556 A | 8/1987 | Joseph | |
| 4,926,995 A | 5/1990 | Kauffman | |
| 5,107,982 A * | 4/1992 | Walter | 198/781.04 |
| 5,586,639 A | 12/1996 | Yoshino | |
| 5,988,362 A * | 11/1999 | Nakamura et al. | 198/831 |
| 6,059,095 A | 5/2000 | Tsuji | |
| 6,183,188 B1 * | 2/2001 | Randazzo et al. | 414/744.5 |
| 6,253,905 B1 | 7/2001 | Pelka | |
| 6,273,105 B1 * | 8/2001 | Jones | 134/64 R |
| 6,390,277 B1 | 5/2002 | Pelka | |
| 6,390,286 B1 * | 5/2002 | Nguyen et al. | 198/781.08 |
| 6,450,325 B1 | 9/2002 | Devnani | |
| 6,523,665 B1 | 2/2003 | Nimmo et al. | 193/35 |
| 6,622,847 B1 * | 9/2003 | Schuitema et al. | 198/399 |
| 6,651,808 B1 * | 11/2003 | Nguyen et al. | 198/781.08 |
| 6,659,264 B1 | 12/2003 | Pelka | 198/456 |
| 6,971,510 B1 * | 12/2005 | Cotter et al. | 198/831 |

FOREIGN PATENT DOCUMENTS

| | | |
|---|---|---|
| DE | 2407173 | 8/1975 |
| EP | 0124269 | 11/1984 |
| EP | 0179537 | 4/1986 |
| GB | 1138386 | 1/1969 |

* cited by examiner

*Primary Examiner*—Douglas A. Hess
(74) *Attorney, Agent, or Firm*—Van Dyke, Gardner, Linn & Burkhart, LLP

(57) ABSTRACT

An unscrambler conveyor including a frame, a plurality of tapered rollers rotatably supported by the frame for unscrambling packages, and means for driving the rollers. Each of the rollers has a longitudinal axis and a polyurethane body that extends along the longitudinal axis to form a tapered outer surface. The tapered outer surfaces of the rollers define a conveying surface and have variations in concentricity of less than 0.01 inches.

21 Claims, 14 Drawing Sheets

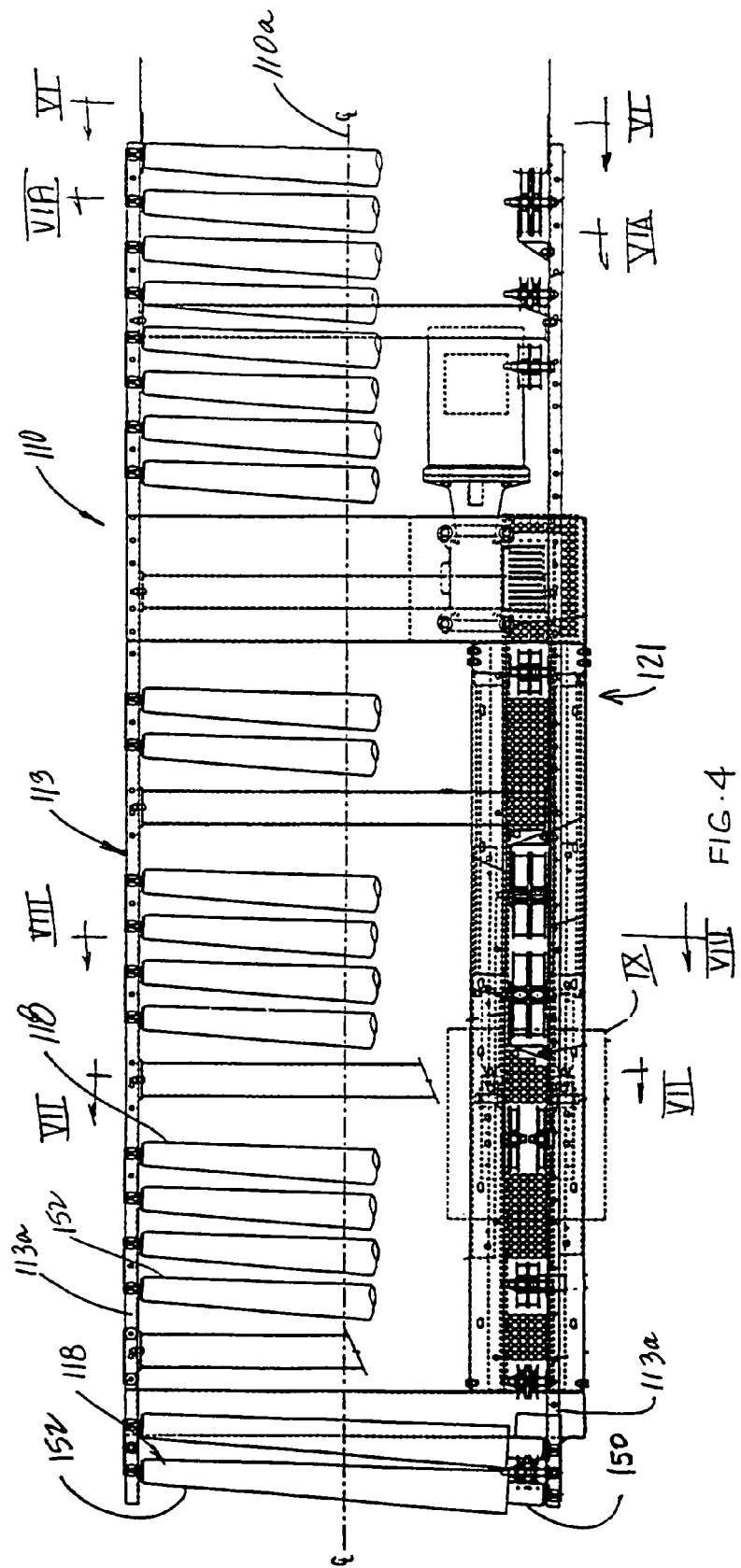

ARTICLE UNSCRAMBLER WITH HIGH SPEED TAPERED ROLLER

This application is a continuation of U.S. patent application Ser. No. 10/407,314, filed Apr. 4, 2003 now abandoned, by Applicants Gerald A. Brouwer and James P. Johnson, entitled ARTICLE UNSCRAMBLER WITH HIGH SPEED TAPERED ROLLER, which claims priority from provisional application, Ser. No. 60/369,975, filed Apr. 4, 2002, which are herein incorporated by reference in its entirety.

TECHNICAL FIELD AND BACKGROUND OF THE INVENTION

The present invention relates to conveyors and, more particularly, to conveyors used to unscramble articles that are received in a random order.

Unscrambling conveyors are positioned between an input conveyor, which delivers articles to the induct or charge end of the unscrambler conveyor, and an output conveyor, which receives articles at the discharge end of the unscrambler conveyor. Unscrambler conveyors typically use skewed rollers that transport articles, which are received at the induct end, in a longitudinal and lateral direction across the conveying surface of the unscrambling conveyor towards one side of the conveyor to align the articles and thereafter discharge the articles from the discharge end of the unscrambling conveyor to the output conveyor. Furthermore, existing unscrambling conveyors use tapered rollers, which define a low side and a high side of the conveyor and move the articles toward the low side when unscrambled. The rollers are typically driven by a belt drive system, which heretofore, has driven the rollers at their low side. As a result, on occasion, the drive assembly may interfere with the unscrambling of the articles.

As conveyor systems increase their efficiency, the speed of the components of conveyor systems has increased. This increase in speed, however, places more of a demand on some components than others. Typically the rollers of unscrambler conveyors must operate at faster speeds than the rollers of the input or output conveyors. For example, most unscrambler conveyors operate at twice the speed of the input and output conveyors in order to maintain the flow of articles through the system. Until recently, these tapered rollers have been metal rollers or straight metal rollers with segmented polyethylene sheathes that are mounted and stacked on the respective rollers to define the conveying surface of the conveyor. The tapered metal rollers, though capable of operating at higher speeds, generate high and usually unacceptable noise levels when operated at higher speeds. For example, when these metal rollers operated to generate a conveyor speed of 400 ft/minute or greater to meet input/output conveyor speeds of about 200 ft/minute, the noise generated by these metal rollers is unacceptable. Rollers with segmented polyethylene sheathes have been found to deteriorate with use over a relatively short period of time and, further, are not durable or impact resistant. Furthermore, when the operated at higher speeds, for example to produce a conveyor speed of 400 feet/minute, the segmented sleeves have been found to deteriorate even faster.

With input and output conveyors operating at conveyor speeds of 200 feet/minute or greater, it has been found that the current unscrambler conveyor designs cannot, therefore, support these increased conveyor speeds without deteriorating or generating unacceptable noise levels. As noted above, typically, an unscrambling conveyor must be operated at a higher speed than the input conveyors, such as twice the speed, in order to provide a continuous throughput for the conveyor system. Therefore, the existing unscrambler conveyors have become a limiting factor in current high speed conveyor systems.

Accordingly, there exists a need for an unscrambling conveyor that can effectively unscramble a large volume of packages at a rate that is commensurate with the existing high speed conveyor equipment without generating unacceptable noise levels and, further, in a manner to provide increased longevity to the components.

SUMMARY OF THE INVENTION

Accordingly, the present invention provides an unscrambling conveyor that can operate at significantly higher speeds than conventionally known unscrambling conveyors and, further, in a manner which generates acceptable noise levels.

In one form of the invention, an unscrambling conveyor assembly of the present invention includes a frame, a plurality of tapered rollers, which are rotatably supported by the frame for unscrambling packages, and means for driving the rollers. Each of the rollers has a longitudinal axis and a polyurethane body, which extends along the longitudinal axis to form a tapered outer surface. The tapered outer surfaces define the conveying surface of the unscrambling conveyor and have variations in concentricities of less than 0.01 inches.

In one aspect, the concentricities of the outer surfaces vary less than 0.008 inches and, more preferably, about 0.005 inches or less.

In other aspects, each of the rollers includes a cylindrical base, with the polyurethane bodies being either adhered to or molded on the cylindrical bases of the rollers. For example, the cylindrical bases may comprise straight rollers, with the polyurethane bodies of each respective tapered roller comprising a polyurethane body having a thickness that increases at a generally uniform rate along the longitudinal axis of the tapered rollers to form the tapered outer surfaces. In a further aspect, the polyurethane body of the respective rollers comprises a unitary sleeve.

According to yet another aspect, the means for driving the rollers drives the rollers at a speed of at least 900 rpm.

In yet another aspect, the rollers have a high side and a low side, with the packages unscrambled by the rollers moving toward the low side when unscrambled. In addition, the means that drives the rollers drives the high side of the rollers to thereby minimize interference between the driving means and the packages.

According to yet another aspect, the longitudinal axes of the rollers lie in a non-horizontal plane wherein the conveying surface defined by the tapered outer surfaces is angled at a greater angle than the taper angle of the tapered outer surfaces of the rollers or wherein the conveying surface is substantially horizontal.

According to another form of the invention, an unscrambler conveyor assembly includes a frame, a plurality of tapered rollers, which are rotatably supported by the frame, and means for driving the rollers. When the means for driving the rollers is operated, the rollers are driven at a speed of at least 900 rpm, more preferably, at least 1,000 rpm and, most preferably, at least 1,100 rpm.

In another form of the invention, an unscrambler conveyor assembly includes a frame, a plurality of tapered rollers, which are rotatably supported by the frame, and means for driving the rollers at a high side of the rollers to thereby minimize interference between the driving means and the packages being unscrambled, which move toward the low side of the rollers when unscrambled.

In one aspect, the means that drives the rollers generates a conveying speed of at least 500 feet per minute and, more preferably, at least 600 feet per minute. In preferred form, the means to drive the rollers comprises a drive belt system.

In yet another form of the invention, an unscrambler conveyor assembly includes a frame, a plurality of tapered rollers, which are rotatably supported by the frame, and a means for driving the tapered rollers. Each of the tapered rollers has a longitudinal axis and comprises a base roller with a monolithic polyurethane body extending along the longitudinal axis to form a continuous tapered outer surface.

In one aspect, the means for driving the rollers comprises a belt drive system and, further, includes a belt that drivingly engages the base rollers to thereby drive the tapered rollers.

According to yet another form of the invention, an unscrambling conveyor includes a frame, a plurality of tapered rollers, which are rotatably supported by the frame, and means for driving the tapered rollers. Each of the tapered rollers has a longitudinal axis and comprises a straight base roller with a monolithic polyurethane body extending along the longitudinal axis, with the polyurethane body having a thickness that increases along the longitudinal axis of the respective roller at a generally uniform rate to form a continuous tapered outer surface.

From the foregoing, it can be appreciated that the unscrambling conveyor of the present invention can be operated at far higher speeds than conventional unscrambling conveyors without generating the noise levels associated with conventional metal rollers. These and other objects, advantages, purposes, and features of the invention will become more apparent from the study of the following description taken in conjunction with the drawings.

BRIEF DESCRIPTION OF THE DRAWINGS

FIG. 4 is a plan view of another embodiment of the unscrambler conveyor of the present invention;

DETAILED DESCRIPTION OF THE PREFERRED EMBODIMENTS

Figure 1:
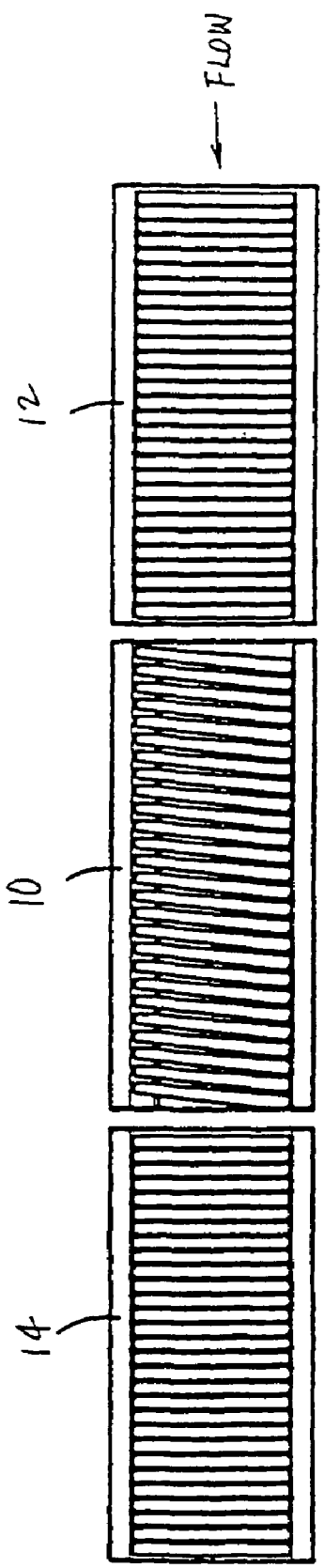
FIG. 1 is a plan view of a conveyor system incorporating the unscrambling and aligning conveyor of the present invention.
Figure 2:
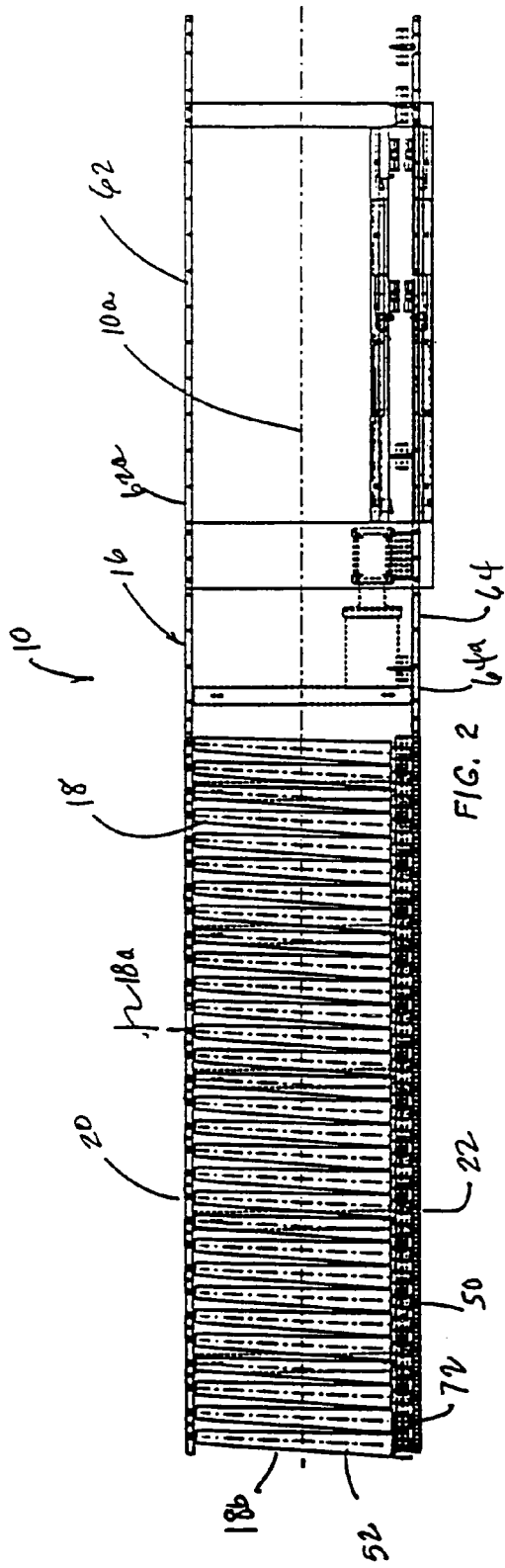
FIG. 2 is a plan view of an unscrambler conveyor of FIG. 1.
Figure 3:
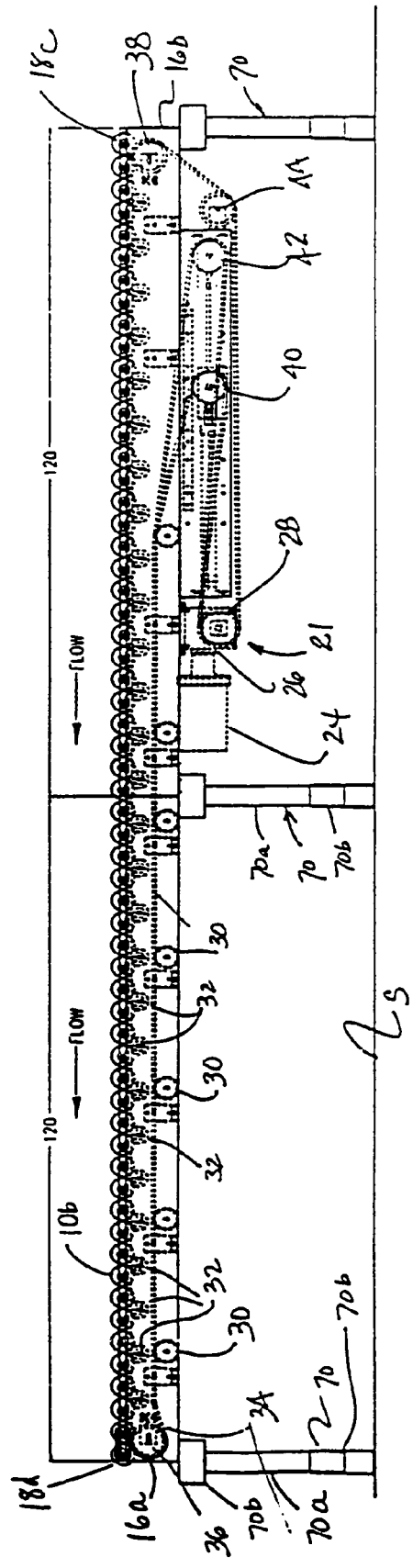
FIG. 3 is a side elevation view of the unscrambler conveyor of FIG. 2.

Referring to FIGS. 1–3, the numeral 10 generally designates an unscrambling and aligning conveyor 10 of the present invention. Unscrambling and aligning conveyor 10 is particularly suitable for placing inline between an input conveyor 12, which delivers articles to the induct or charge end of conveyor 10, and an output conveyor 14, which receives articles discharged from the discharge end of conveyor 10. Furthermore, similar to the unscrambling and aligning conveyor described in co-owned U.S. Pat. No. 6,253,905 (which is herein incorporated by reference in its entirety), unscrambling and aligning conveyor 10 may have similar, if not the same, width dimensions as input and output conveyors 12 and 14 so that conveyor 10 can be placed in an existing conveyor system with a one-for-one replacement with a conventional straight run conveyor. As will be more fully described below, unscrambling and aligning conveyor 10 operates at a faster speed than input conveyor 12 to thereby create a space or gap between the articles delivered to unscrambling and aligning conveyor 10. When side-by-side articles are delivered to unscrambling and aligning conveyor 10, articles that align with the enlarged end of the tapered rollers will accelerate relative to the articles conveyed on the lower end of the tapered rollers to generate a gap between two articles, which enables the articles to be singulated and aligned along the lower side of conveyor 10.

Referring to FIGS. 2 and 3, unscrambling and aligning conveyor 10 includes a frame 16, which supports a plurality of tapered rollers 18. Tapered rollers 18 are skewed, with their longitudinal axes 18a being generally non-orthogonal to the longitudinal axis 10a of conveyor 10. Furthermore, longitudinal axes 18a of rollers 18 are preferably aligned along a horizontal plane with respect to the support surface (S) (FIG. 3) on which conveyor 10 rests so that the angle of the conveying surface lies in a plane that is angled at the same angle as the taper angle of the individual rollers 18. Consequently, when articles are delivered from input conveyor 12 to conveyor 10, the articles will tend to be singulated along an axis over the lower side 20 of conveyor 10. However, the respective longitudinal axes of the rollers may lie in a non-horizontal plane such that the angle of the conveying surface is either greater or less than the taper angle of the rollers or, for example, so that the conveying surface is horizontal. Furthermore, as will be more fully described below, unscrambling and aligning conveyor 10 can operate at speeds that far exceed conventional roller unscrambler conveyors and with noise levels at or below maximum acceptable levels.

In preferred form, rollers 18 are driven by a drive assembly 21, which drives rollers 18 at the high side 22 of conveyor 10. With this configuration, conveyor 10 minimizes the interference between articles conveyed on conveying surface 10b and drive assembly 21. In the illustrated embodiment, the motor and associated gear of drive assembly 21 are located below rollers 18, but it should be understood that they may be upstream for example, under input conveyor 12 or output conveyor 14, as will more fully described in reference to another embodiment illustrated in FIGS. 10–12.

As best understood from FIG. 3, drive assembly 21 comprises a belt drive system and includes a motor 24, a gear reducer 26, and a pair of drive pulleys or sheaves 28. Drive system 21 further includes a plurality of guide pulleys or sheaves 30 and pressure pulleys or sheaves 32, which support a pair of closed loop drive belts 34 around a closed loop path, with pressure pulleys 32 urging belts 34 to engage rollers 18 to thereby drive the rollers. In addition, drive assembly 21 includes return pulleys or sheaves 36, 38 that are mounted to frame 16 at opposed ends of frame 16 and, further, inward from distal ends 16a and 16b of frame 16. In addition, drive assembly 21 includes pairs of redirection pulleys 40, 42, and 44 which redirect belts 34 from drive pulleys 28 so that belts 34 extend around the closed loop path over support pulleys 30 and pressure pulleys 32. As noted above, pressure pulleys 32 support and urge drive belts 34 into frictional engagement with rollers 18 at high side 22. In preferred form, belts 34 drivingly engage the proximate ends of the base of the respective rollers 18, as will be more fully described below.

Figure 3A:
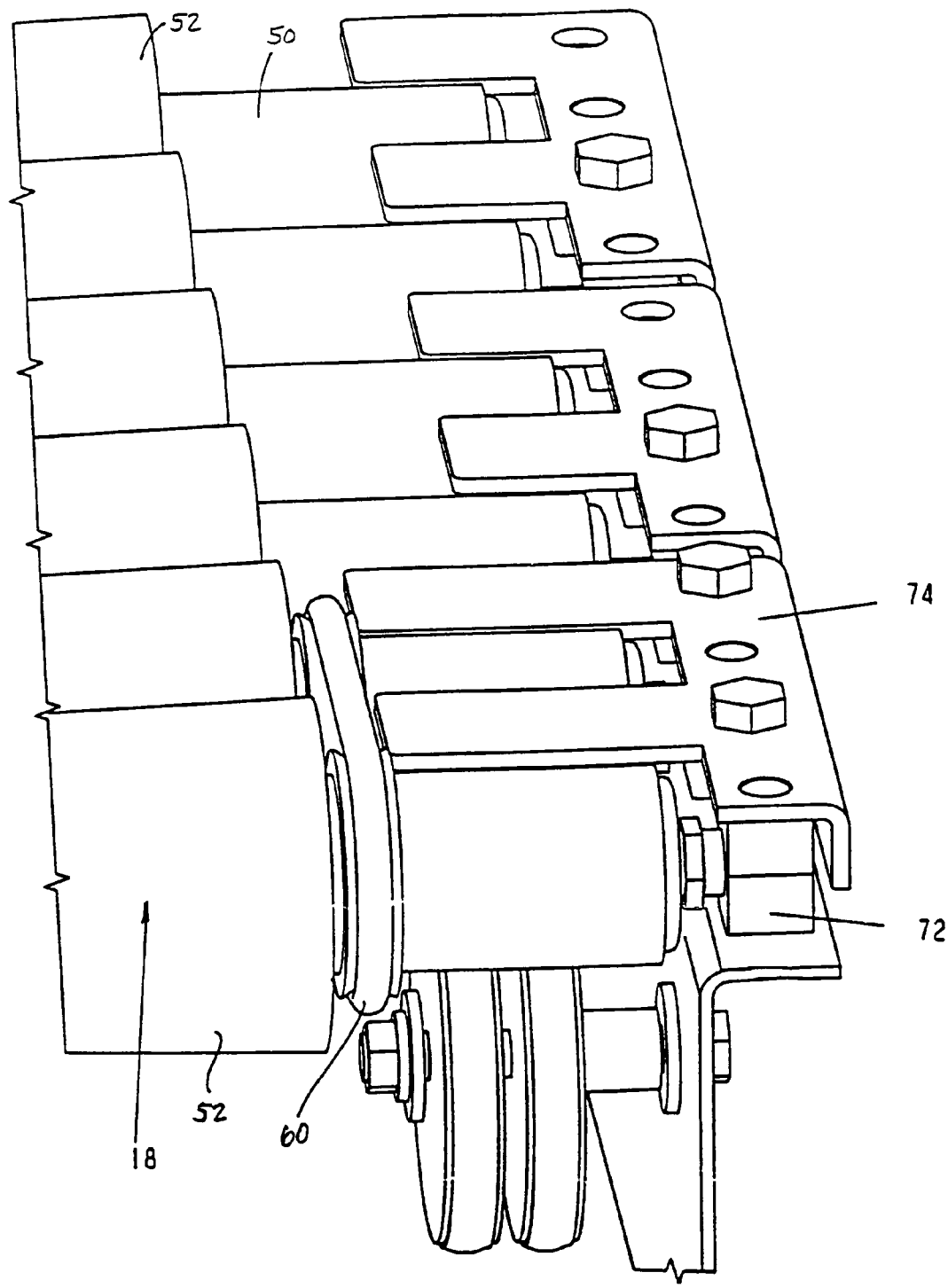
FIG. 3A is an enlarged perspective view of a portion of the unscrambling conveyor of FIG. 2 illustrating the high side of the conveyor.
Figure 3B:
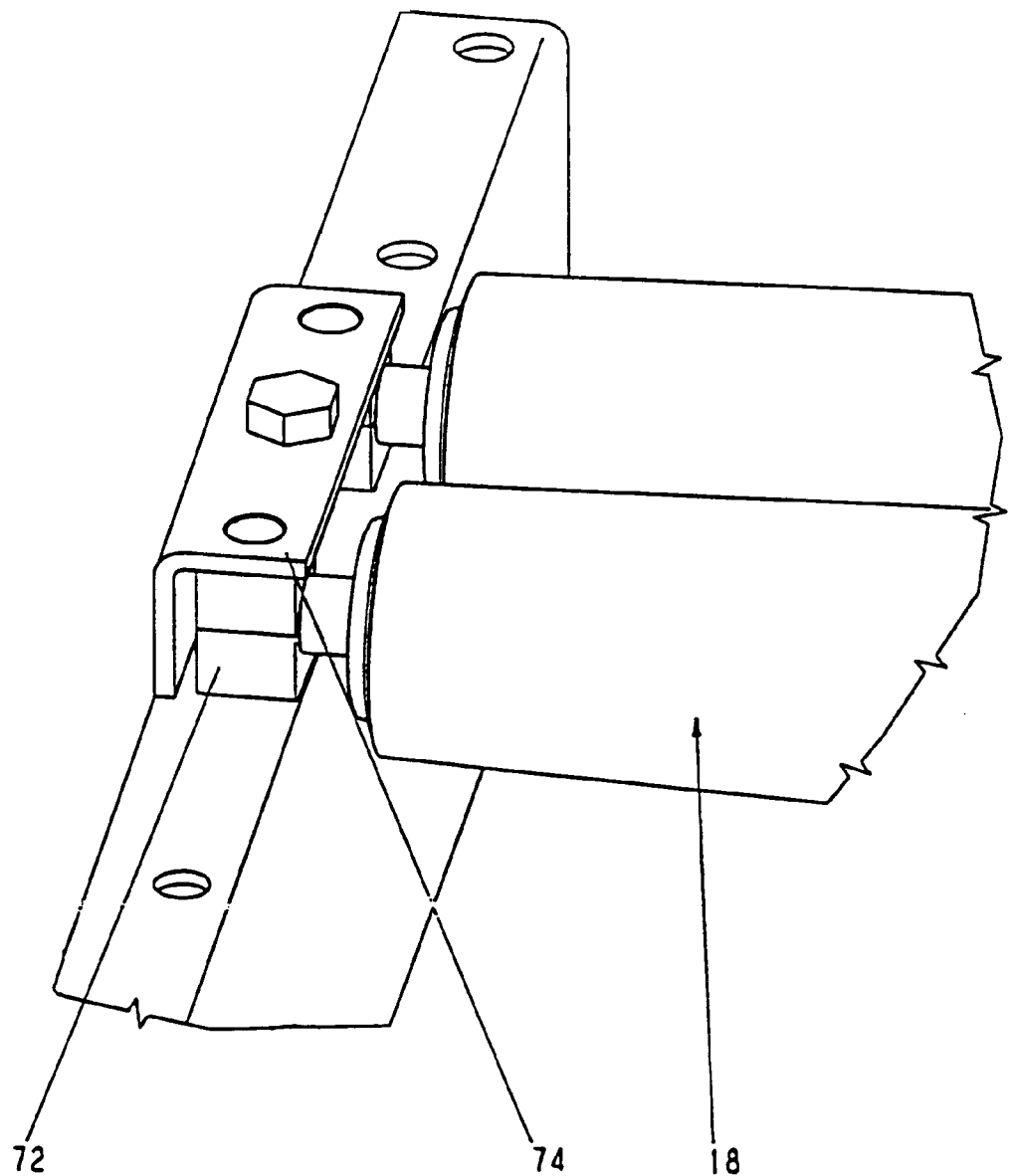
FIG. 3B is an enlarged top perspective view of a portion of the conveyor of FIG. 2 illustrating the low side of the conveyor.

Referring to FIGS. 2 and 3A, each roller 18 includes a polyurethane body 52. Each polyurethane body 52 preferably comprises a monolithic body—in other words, the body is cast or formed as a single piece and formed of a polyurethane material without joints or seams. Each roller 18 further includes a base 50, such as a metal base roller, to which the polyurethane body is applied or formed. Optionally, polyurethane body 52 maybe formed as a sleeve in a mold, such as by casting or injection molding, and thereafter mounted on base 50 and, preferably, secured thereto by an adhesive. The surface of the base roller may be physically or chemically treated, such as by scuffing or by forming or providing a knurled surface or by applying a primer, to increase adhesion of the polyurethane body to the base roller. Alternately, polyurethane body 52 may be provided by forming polyurethane body 52 on base 50, such as by injection molding. In preferred form, base 50 comprises a straight metal roller, with polyurethane body 52 having a thickness that decreases across the roller longitudinal axis from a high side 22 to low side 20 at a substantially generally uniform rate to thereby form tapered outer surface 18b of rollers 18. For example, for a thirty-six inch roller, body 52 may have a thickness in a range of about 1.5 to 0.75 inches, more preferably, in a range of about 1.0 to 0.9 inches, which then tapers down to a thickness in a range of about 0.25 to 0.0625 inches and, more preferably, in a range of about 0.20 to 0.15 inches. However, it should be understood that these thicknesses may be adjusted as needed, including to accommodate longer or shorter rollers. In addition the length of body 52 may vary with each length of roller. For example, for a thirty-six inch roller, the length is preferably in a range of 28 inches to 32 inches. Alternately, base 50 may comprise a tapered roller, with body 52 having a generally uniform thickness across longitudinal axis 18a, with a thickness in a range of 2.0 to 0.125 inches, for example.

In the illustrated embodiment, each polyurethane body 52 extends from adjacent a first end of the roller to adjacent a second end of the roller so that it extends substantially across the width of conveyor 10 to define the conveying surface but preferably terminates before the proximate end of base 50 to expose the proximate ends of bases 50 so that, as previously described, they can be driven by drive belts 34. In order to eliminate interference between conveyor 10 and the input and output conveyors, redirection pulleys or sheaves 36 and 38 are mounted inward from the distal end 16a and 16b of frame 16. Therefore, in order to drive the end rollers, the first and last rollers 18c and 18d are driven by the adjacent rollers with an O-ring belt 60 (best seen in FIG. 3A). In this manner, assembly 10 may be positioned in close proximity to input conveyor 12 and output conveyor 14.

In the illustrated embodiment, frame 16 comprises a pair of spaced apart side members 62 and 64, which in the illustrated embodiment comprise channel-shaped members. Side members 62 and 64 are supported above surface S by sub-frames 70. Sub-frames 70 may comprise any number of configurations but preferably include a pair of legs 70a, which are braced by transverse member 70b. Rollers 18 are supported on upper flanges 62a, 64a of side members 62 and 64 with their respective shafts journaled in axle supports 72, which are mounted to flanges 62a, 64a. Optionally, frame 16 may include, mounted thereto, cover plates 74, such as illustrated in reference to the second and third embodiments, which at least partially cover the space between the exposed bases 50 to reduce the risk of articles falling between the increased space between the exposed bases 50.

In preferred form, the variation in concentricity of outer surface 16b of rollers 18 is less than 0.01 inches and, preferably, less than 0.008 inches and, most preferably, about 0.005 inches or less. The variation in concentricity as used herein refers to the deviation of the points of the circles defined by the outer surface of the roller from their center, which is the longitudinal axis (18a) of the roller, with the ideal variation in concentricity being zero. As will be understood by those skilled in the art, the smaller the variation in the concentricity the more accurate the surface of the roller. This low variation in concentricity is achieved either by the molding process or by machining of the polyurethane body once it is applied (whether it is applied by molding or by adhesive in the case of the sleeve) to the base. Furthermore, the polyurethane material forming body 52 is semi-rigid and preferably has a durometer in a range of 40 A to 95 A durometer.

It has been found that driver assembly 21 can drive rollers 18 to speeds that far exceed heretofore achieved using conventional unscrambling conveyors, such as 800 rpm, more preferably, 900 rpm and, most preferably, at speeds that include 1,000 rpm and 1,100 rpm and greater. At these roller speeds, conveyor 10 generates conveying speeds of greater than 300 feet per minute, more preferably, greater than 400 feet per minute and, most preferably, more than 500 feet per minute. In preferred form, conveyor 10 generates conveying speeds greater than 600 feet per minute. As a result, conveyor 10 is particularly suitable for use with newer existing high speed conveyor equipment, which include input and output conveyors that operate at speeds greater than 200 feet per minute, more preferably, greater than 250 feet per minute and, most preferably, greater than 300 feet per minute. With such high conveying speeds, the conveyor system can dramatically increase its throughput and hence speed delivery of the articles conveyed by the conveying system.

As previously noted, accumulating and aligning conveyor 10 accelerates articles delivered to conveyor 10 from input conveyor 12 to create a space or gap between the article and the article behind it. For example, when side-by-side articles are received by conveyor 10, the article that is aligned on the high side of the conveyor will be accelerated with respect to an article received on the low side of the conveyor so that the article on the high side of the conveyor can be moved ahead of the article of the low side of the conveyor and eventually moved to the low side of the conveyor to thereby align the articles on the low side of the conveyor.

Referring to FIG. 4, the numeral 110 is a second embodiment of the unscrambling and aligning conveyor of the present invention. Unscrambling and aligning conveyor 110 is similar to conveyor 10 and is suitable for placing inline between an input conveyor and an output conveyor. Furthermore, unscrambling and aligning conveyor 110 may have similar width dimensions as the input and output conveyors so that conveyor 110 can be placed in an existing conveyor system with a one-for-one replacement with a conventional straight run conveyor. Similar to conveyor 10, conveyor 110 operates at a faster speed than either the input or output conveyor to thereby create a space or gap between the articles delivered to unscrambling and aligning conveyor 110. Preferably, like conveyor 10, conveyor 110 operates at approximately twice the speed of the input and output conveyors.

As best seen in FIG. 4, conveyor 110 includes a plurality of tapered rollers 118, which are skewed relative to the longitudinal axis 110a of conveyor 110. For further details of rollers 118, reference is made to the previous embodiment. Rollers 118 are driven by a drive assembly 121, which is positioned below rollers 118 and preferably contained between the charge end and the discharge end of conveyor 110 similar to the previous embodiment.

Figure 5:
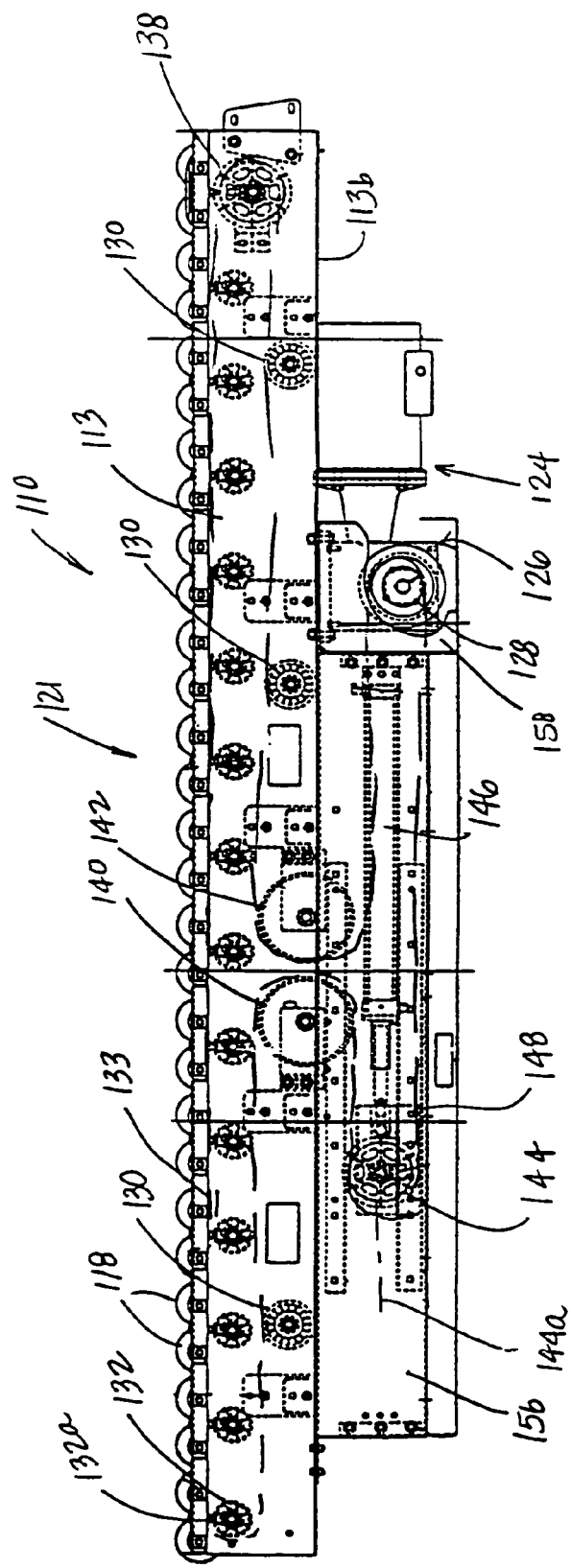
FIG. 5 is a side elevation view of the unscrambler conveyor of FIG. 4.

Referring to FIGS. 4 and 5, drive assembly 121 includes a motor 124 with a gearbox reducer 126 and a pair of drive pulleys 128. Drive assembly 121 further includes a plurality of support pulleys or sheaves 130 and a plurality of pressure pulleys or sheaves 132, which support a pair of closed loop drive belts 133. In addition, drive assembly 121 includes redirection pulleys 138 at one end of conveyor 110, which redirects drive belts 133 from pusher pulleys or sheaves 132 over support sheaves or rollers 130. Drive assembly 121 further includes pairs of intermediate redirection pulleys 140 and 142 which direct drive belts 133 over support pulleys or sheaves 130. Furthermore, drive assembly 121 includes adjustable redirection pulleys 144 that direct drive belts 133 from drive pulleys or sheaves 128 to redirection pulleys 140, which in turn direct drive belts 133 over support pulleys 130. In the illustrated embodiment, end pressure pulleys or sheaves 132a act as redirection pulleys and direct drive belt 133 over pressure pulleys 132 for driving rollers 118. It should be understood that the path of drive belt 133 is exemplary only and that the path of drive belts 133 may vary.

As best seen in FIG. 5, motor 124 and gear box 126 along with adjustable redirection pulley 144 are mounted below frame 113 and, as previously noted, are supported inward from the charge and discharge ends of conveyor 110. Frame 113 is of similar construction to frame 13 and includes side frame members 160, which are interconnected or braced by transverse members 115.

Referring again to FIG. 5, redirection pulleys 144 are adjusted by a pair of cylinders 146, preferably pneumatic cylinders and, more preferably, double acting pneumatic cylinders, which are actuated by a control system to move redirection pulleys 144 along parallel adjustment axes 144a to thereby increase or decrease the tension on belts 133, as would be understood by those skilled in the art.

Figure 9:
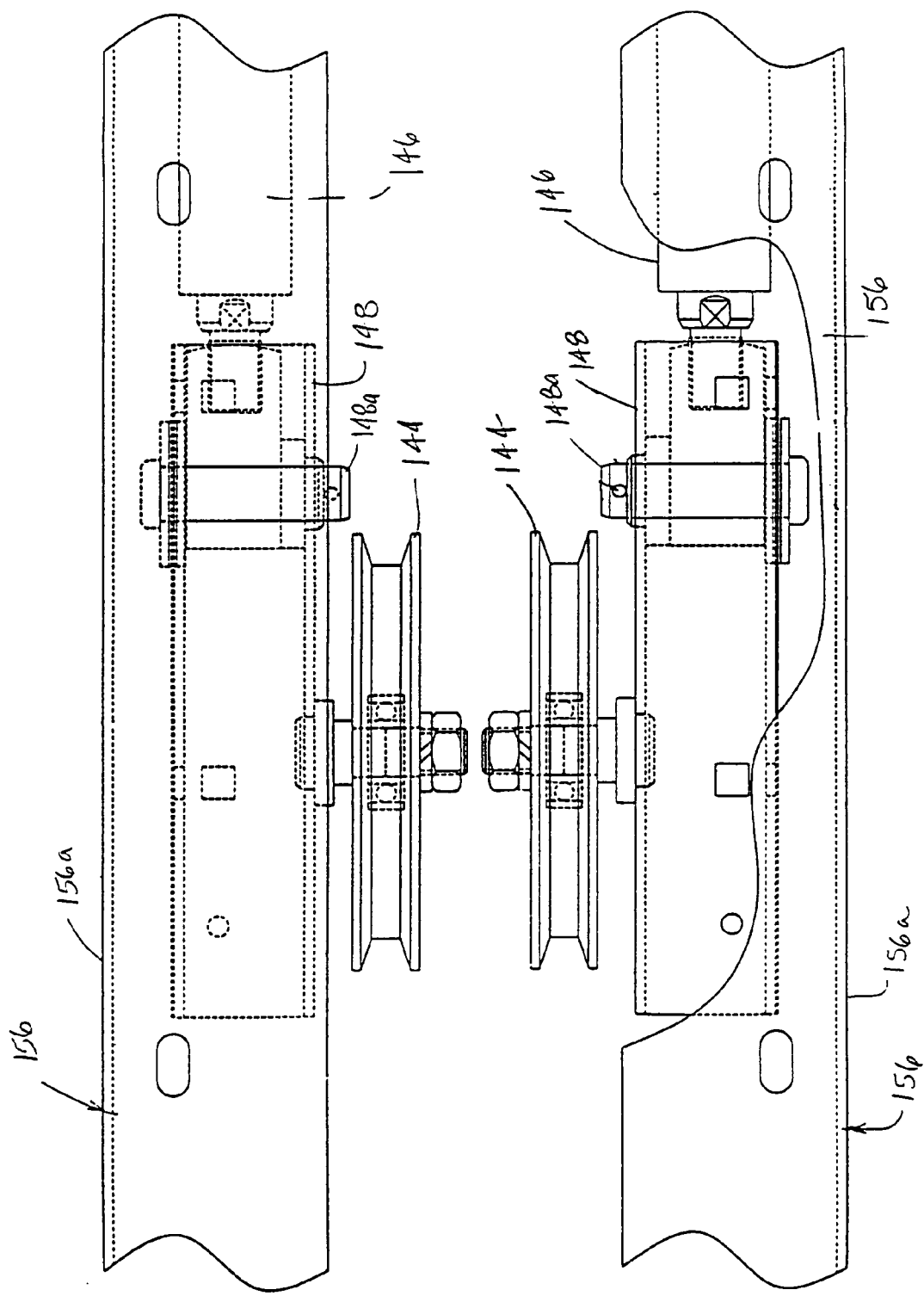
FIG. 9 is a partial fragmentary plan view of detail IX—IX of FIG. 4.

Referring to FIG. 9, redirection pulleys or sheaves 144 are each respectively rotatably mounted on a support member 148 to which rod end of cylinder 146 is coupled, for example, by a pin 148a. Support members 148 are movably mounted on tracks 151a (FIG. 7), which in turn are mounted to a sub-frame 156 that is mounted to frame 113 below rollers 118. Sub-frame 156 preferably houses and encloses cylinders 146 and redirection pulleys 144. In the illustrated embodiment, gear box 126 and motor 124 are mounted to a lower flange 113b of frame 113, with gear box 126 and driver sheave 128 preferably housed in compartment 158 adjacent sub-frame 156 and below frame 113.

Similar to the previous embodiment, drive assembly 121 is preferably aligned with the high side of conveyor 110 to minimize interference with packages being unscrambled and singulated by conveyor 110. In addition, drive belts 133 drivingly engage the respective bases 150 of roller 118.

Figure 6:
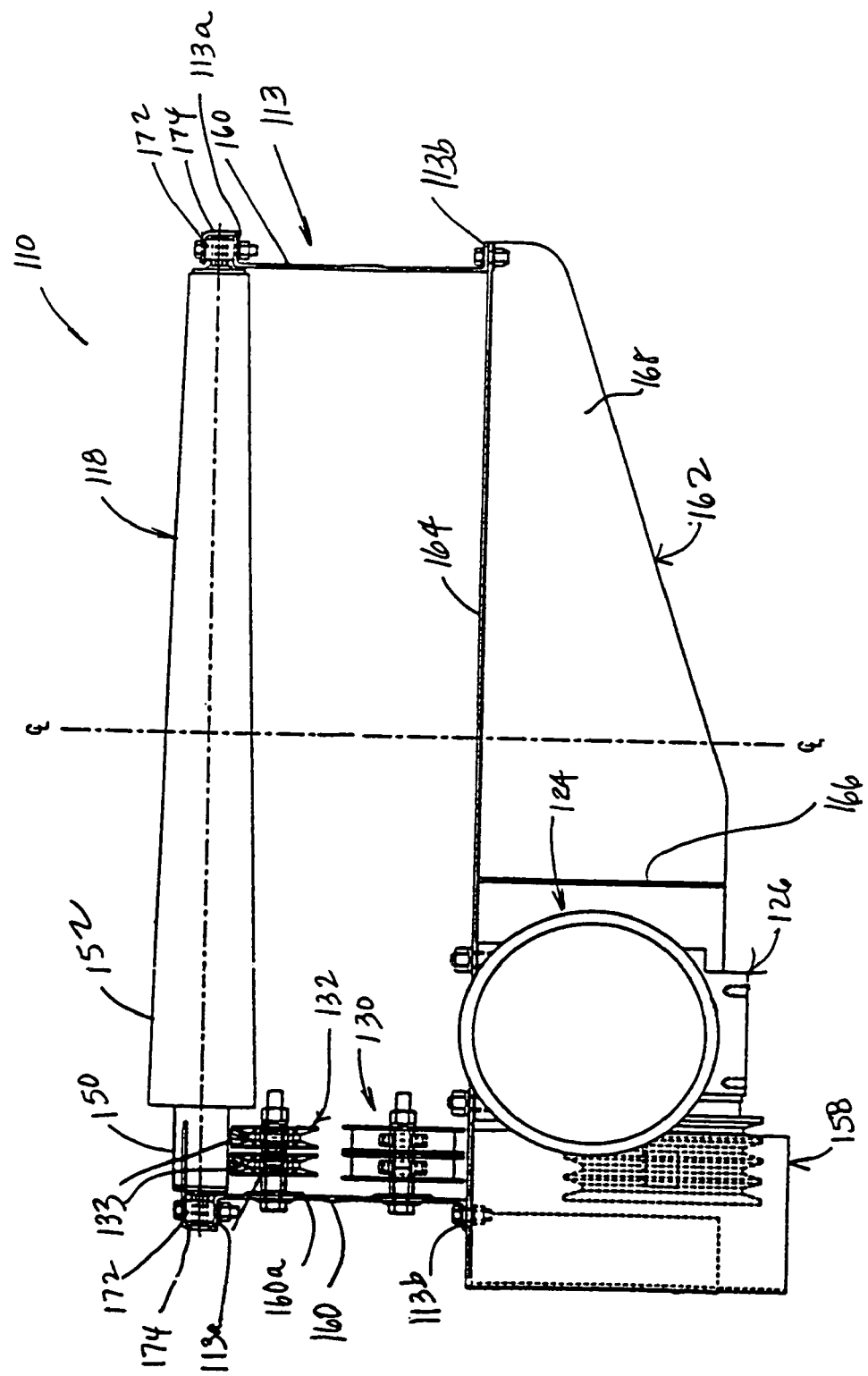
FIG. 6 is an enlarged end view of the conveyor of FIG. 4 as viewed from lines VI—VI.
Figure 6A:
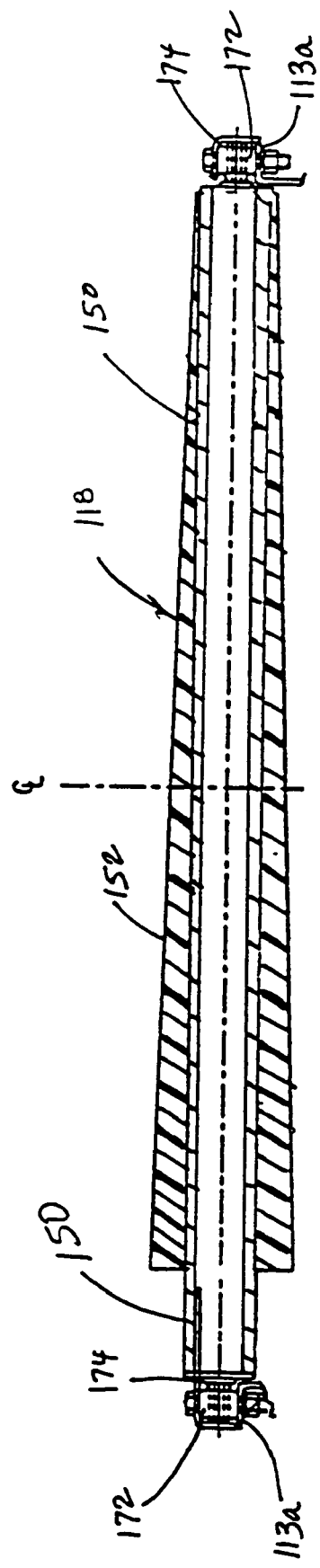
FIG. 6A is a cross-section view taken along line VIA—VIA of FIG. 4.

As best seen in FIG. 6, pressure pulleys or sheaves 132 are mounted to the web 160a of side frame member 160 of frame 113 below rollers 118. Support pulleys 130 are similarly mounted to web 160a below pressure pulleys 132 so that, as previously noted, drive belts 133 are aligned with the high side of conveyor 110 to engage exposed portion of bases 150. As best seen in FIG. 6, motor 124 and gear box 126 are mounted to frame 113 and to a transverse support structure 162, which forms compartment 158. Transverse support 162 includes an upper flange 164, which is mounted to lower flanges 113b of frame 113 and, further, is reinforced by gusset plates 166 and 168, with gusset plate 168 extending transversely across conveyor 110.

Figure 7:
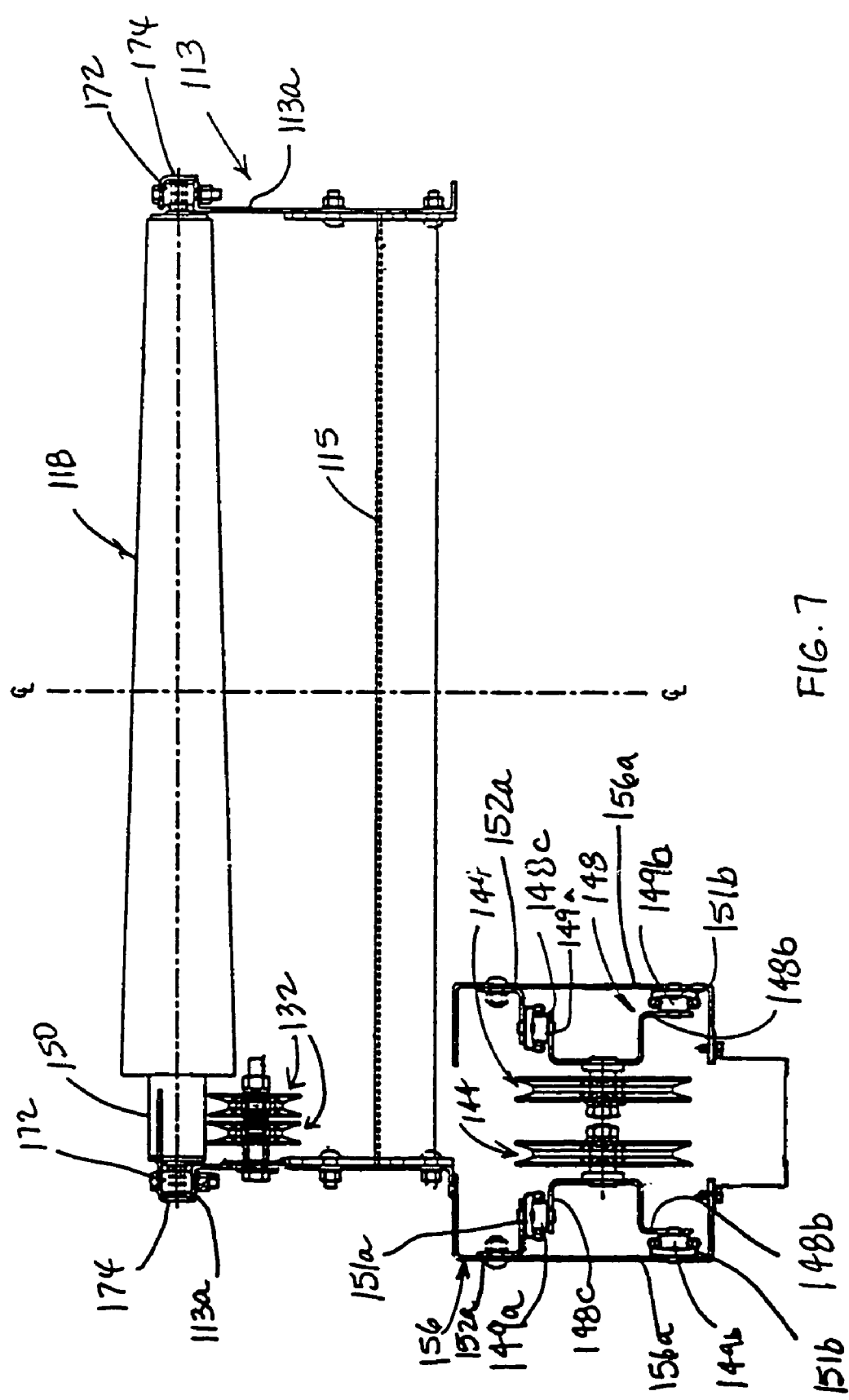
FIG. 7 is a cross-section view taken along line VII—VII of FIG. 4.

As best seen in FIG. 7, support members 148 comprise generally channel-shape members with downwardly depending flanges 148b. Upper flanges 148c and downwardly depending flanges 148b include guide members 149a and 149b, respectively, which guide support members 148 along tracks 151a and 151b. Tracks 151a are mounted to sub-frame 156 by support members 152a, such as angle members, which are attached to the vertical webs 156a of sub-frame 156, for example by fasteners or the like. Rails 151b are directly mounted to webs 156a of sub-frame 156 and together with rails 151a support redirection pulleys 144 for movement along parallel axes 144a to adjust the tension on the respective drive belts 133. It should be understood that cylinders 146 may be individually actuated to provide individual adjustment to the respective drive belts. Alternately, cylinders 146 may be actuated by a single control to provide individual adjustment to the respective drive belts.

Figure 8:
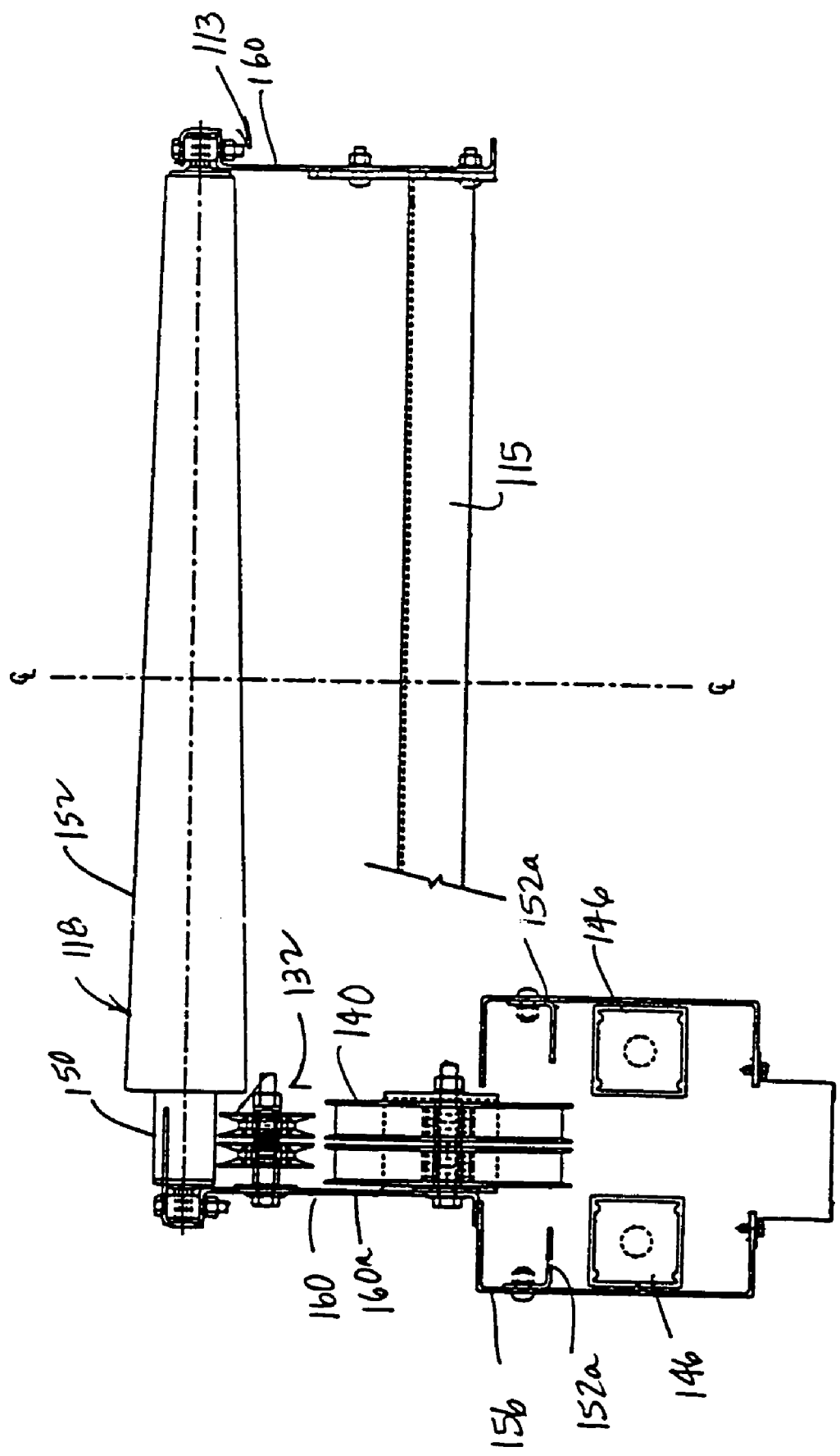
FIG. 8 is a cross-section view taken along line VIII—VIII of FIG. 4.

As best seen in FIG. 8, redirection pulleys 140 are similarly mounted to web 160a of side frame member 160 and are positioned below pressure sheaves or pulleys 132. Furthermore, redirection pulleys 140 (as well as redirection pulleys 142) extend below frame 113 and into sub-frame 156.

As previously noted in reference to the first embodiment, rollers 118 are mounted to the upper flanges 113a of side frame members 160 by axle supports 172. Extending over axle supports 172 on both ends of rollers 118 are angle members 174, which are mounted to flanges 113a, for example, by bolts or the like. Angle members 174 provide a barrier to the rotating ends of the rollers but are optional. In addition, the angles (174) positioned on the high-side of conveyor 110 may include projecting plates mounted thereto, which are aligned between the respective bases 150 of rollers 118—in this way, the gaps between the exposed bases of the rollers are reduced to avoid snagging or jamming of articles.

Figure 10:
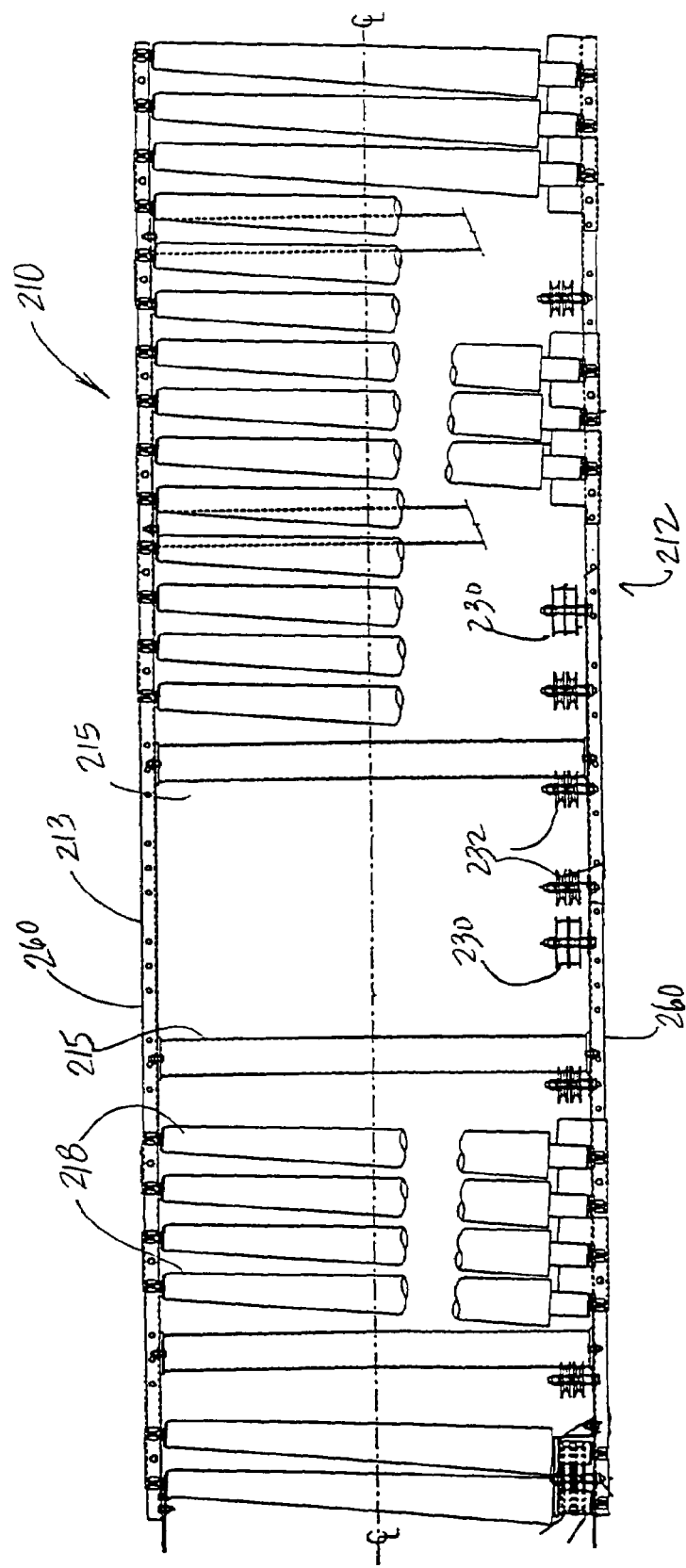
FIG. 10 is a plan view of yet another embodiment of the unscrambled conveyor of the present invention.
Figure 11:
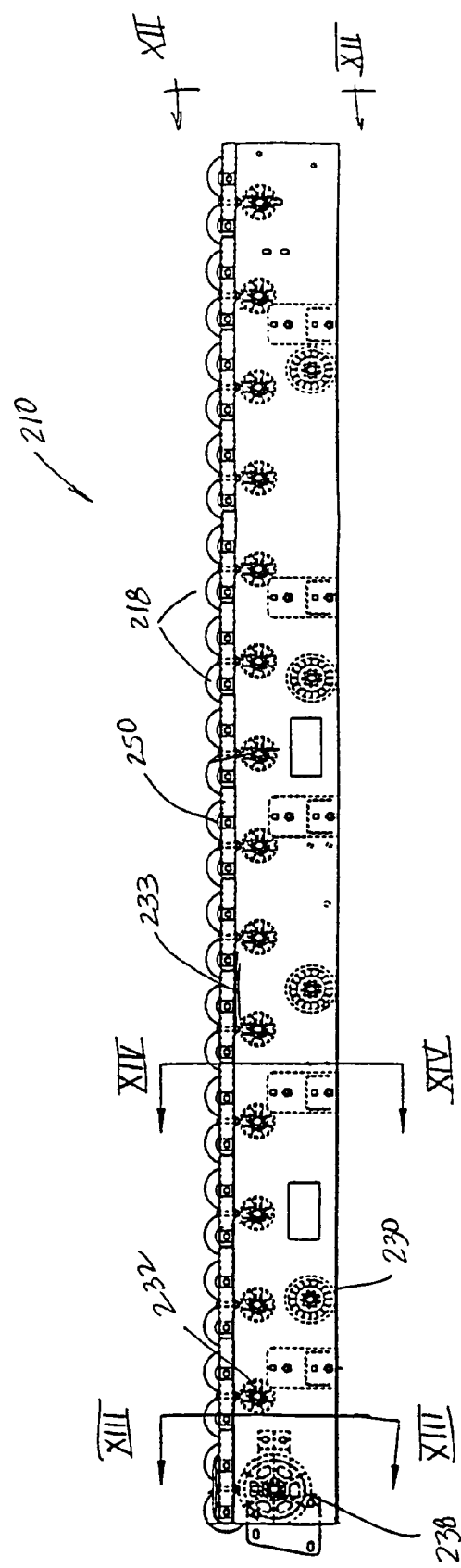
FIG. 11 is a side elevation view of the unscrambler conveyor of FIG. 10.
Figure 13:
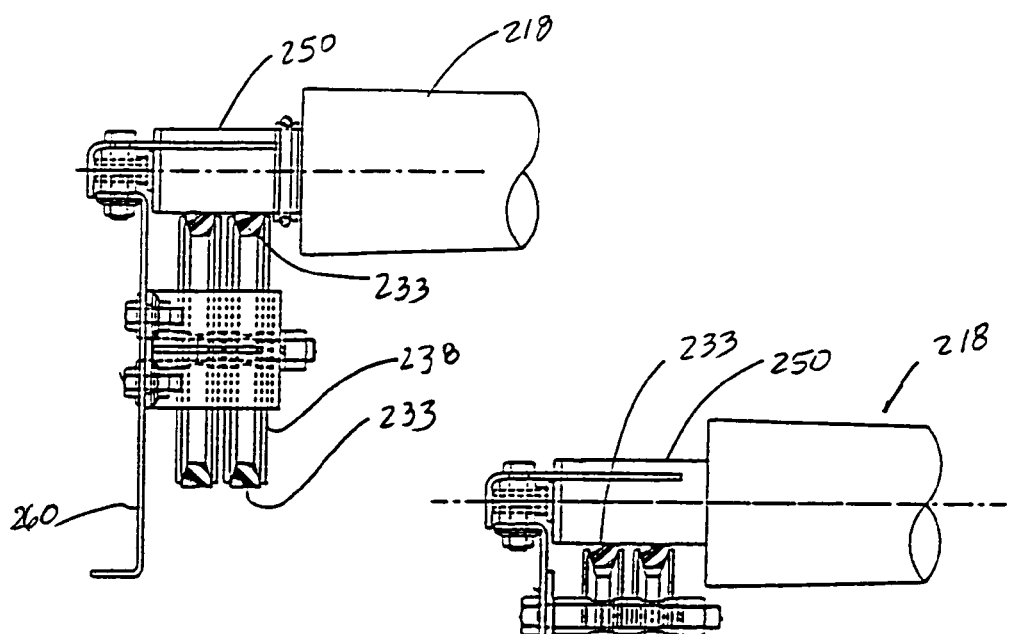
FIG. 13 is a cross-section view taken along line XIII—XIII of FIG. 10.
Figure 14:
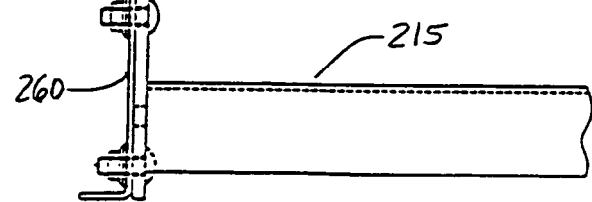
FIG. 14 is a partial cross-section view taken alone line XIV—XIV of FIG. 10.
Figure 12:
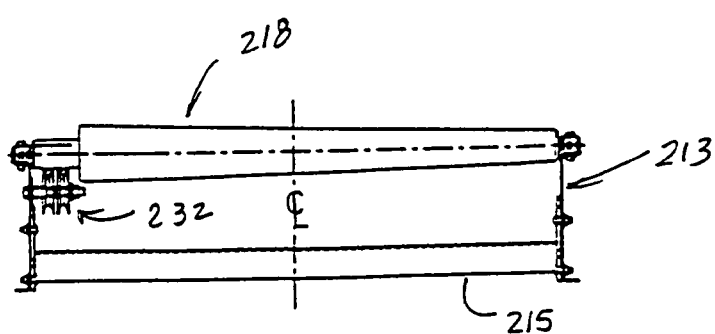
FIG. 12 is an end view of the unscrambler conveyor of FIG. 10.

Referring to FIGS. 10 and 11, the numeral 210 designates another embodiment of the unscrambling and aligning conveyor of the present invention. Conveyor 210 includes a plurality of rollers 218 similar to rollers 18, 118 of the previous embodiments. Rollers 216 are supported on frame 213, similar to frame 113, which includes a pair of opposed side frame members 260 that are interconnected by transverse members 215. Similar to the previous embodiments, rollers 218 are driven on their high side by a driver assembly 212.

In the illustrated embodiment, driver assembly 212 includes a plurality of pressure pulleys or sheaves 232 and support sheaves or pulleys 230 similar to the previous embodiment and, further, redirection pulleys or sheaves 238 which together support and direct a pair of drive belts 233 through conveyor 210 to drive the exposed bases 250 of rollers 218 on the high side of conveyor 210. However, in the illustrated embodiment, the motor and drive gear for driving belts 233 are located under an adjacent conveyor section, such as the input or output conveyor. Therefore, conveyor section 210 is adapted to cooperate with the drive mechanisms of an adjacent conveyor section to simplify conveyor 210. In this manner, conveyor 210 has reduced clearance requirements and has a more compact configuration than the previous embodiments.

While several forms of the invention have been shown and described, other forms will now be apparent to those skilled in the art. For example, the drive assemblies described herein are intended to be exemplary only and not intended to be limiting. Furthermore, the configurations of the frame and its components are exemplary only. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

The embodiments of the invention in which an exclusive property right or privilege is claimed are defined as follows:

1. An unscrambler conveyor assembly comprising:
    a frame;
    a plurality of tapered rollers rotatably supported by said frame for unscrambling packages, each of said rollers having a first end, a second end, a longitudinal axis, and a longitudinal extent extending along said longitudinal axis from approximate said first end to approximate said second end, each of said rollers having a base and a unitary polyurethane body extending along said longitudinal axis across said longitudinal extent, said base having an outer surface, said unitary polyurethatne body having an inner surface bonded to said outer surface of said base, each of said unitary polyurethane bodies having a solid cross-section extending along said longitudinal extent to form a tapered outer surface, said tapered outer surfaces of said rollers defining a conveying surface; and
    means for driving said tapered rollers.

2. The unscrambler conveyor assembly according to claim 1, said polyurethane bodies being bonded by being adhered to or molded on said bases. said bases.

3. The unscrambler conveyor assembly according to claim 2, wherein said bases comprise straight base rollers, said polyurethane body of each respective tapered roller extending from said base rollers to said tapered outer surface and having a thickness, said thicknesses increasing at a generally uniform rate along said longitudinal extend of said tapered rollers to thereby form said tapered outer surfaces.

4. The unscrambler conveyor assembly according to claim 1, wherein said outer surfaces of said tapered rollers have variations in concentricity of less than 0.01 inch.

5. The unscrambler conveyor assembly according to claim 4, wherein said variations are about 0.005 inches or less.

6. The unscrambler conveyor assembly according to claim 1, wherein said means drives said rollers at a speed of at least 900 rpm.

7. The unscrambler conveyor assembly according to claim 1, wherein said rollers have a high side and a low side, packages being unscrambled by said rollers moving toward said low side when unscrambled, and said means driving said high side thereby minimizing interference between said means and the packages being unscrambled.

8. The unscrambler conveyor assembly according to claim 1, wherein said longitudinal axes of said rollers lie in a non-horizontal plane, said tapered outer surfaces having a taper angle, said conveying surface defined by said tapered outer surfaces being angled at a greater angle than said taper angle of said tapered outer surfaces of said rollers.

9. An unscrambler conveyor assembly comprising:
    a frame;
    a plurality of tapered rollers rotatably supported by said frame, each of said tapered rollers having a first end, a second end, a longitudinal axis and a longitudinal extent extending from approximate said first end to approximate said second end, each of said tapered rollers including a base roller and a unitary polyurethane body formed without joints extending from said base roller along said longitudinal extent and forming a tapered outer surface of said tapered roller, said tapered outer surfaces defining a conveying surface; and
    means for driving said tapered rollers, when operated said means driving said tapered rollers at a speed of at least 900 rpm.

10. The unscrambler conveyor assembly according to claim 9, wherein said means drives said tapered rollers at a speed of at least 1000 rpm.

11. The unscrambler conveyor assembly according to claim 9, wherein said means drives said tapered rollers at a speed of at least 1100 rpm.

12. The unscrambler conveyor assembly according to claim 9, wherein said means comprises a belt drive system.

13. The unscrambler conveyor assembly according to claim 9, wherein said outer surfaces of said tapered rollers have variations in concentricity of less than 0.01 inch.

14. The unscrambler conveyor assembly according to claim 13, wherein said variations are about 0.005 inches or less.

15. The unscrambler conveyor assembly according to claim 9, wherein said unitary polyurethane body is formed without seams.

16. An unscrambler conveyor assembly comprising:
    a frame;
    a plurality of tapered rollers rotatably supported by said frame, each of said tapered rollers having a longitudinal axis and comprising a straight base roller with an outer surface with terminal ends and a monolithic unitary polyurethane body having a solid cross-section extending from said straight base roller along said longitudinal axis from adjacent one of said terminal ends to adjacent to another of said terminal ends, each of said unitary polyurethane bodies having a thickness, said thicknesses increasing across said longitudinal axes at a generally uniform rate to form continuous tapered outer surfaces; and
    means for driving said tapered rollers.

17. The unscrambler conveyor assembly according to claim 16, wherein said polyurethane bodies are one of adhered to and molded on said base rollers.

18. The unscrambler conveyor assembly according to claim 17, wherein said polyurethane bodies extend across said base rollers to define the width of the conveying surface of the unscrambler conveyor assembly.

19. The unscrambler conveyor assembly according to claim 18, wherein said wherein said means drives said rollers at a speed of at least 900 rpm.

20. The unscrambler conveyor assembly according to claim 18, wherein said outer surfaces of said rollers have variations in concentricities of less than 0.01 inch.

21. The unscrambler conveyor assembly according to claim 18, wherein said means drives said rollers to generate a conveying speed of at least 500 ft/minute.

* * * * *

UNITED STATES PATENT AND TRADEMARK OFFICE
CERTIFICATE OF CORRECTION

PATENT NO. : 7,114,613 B2  Page 1 of 1
APPLICATION NO. : 11/093538
DATED : October 3, 2006
INVENTOR(S) : Gerald A. Brouwer and James P. Johnson It is certified that error appears in the above-identified patent and that said Letters Patent is hereby corrected as shown below:

Column 9:
Line 44, Claim 1, "ployurethatne" should be --polyurethane--.
Line 54, Claim 2, Delete --said bases-- in the second occurrence.

Column 11:
Line 9, Claim 19, Delete --wherein said-- in the second occurrence.

Signed and Sealed this

Thirteenth Day of May, 2008

JON W. DUDAS
*Director of the United States Patent and Trademark Office*